J. BEAUDRY.
ROCK DRILL.
APPLICATION FILED OCT. 22, 1920.
1,436,470.
Patented Nov. 21, 1922.
2 SHEETS—SHEET 1.
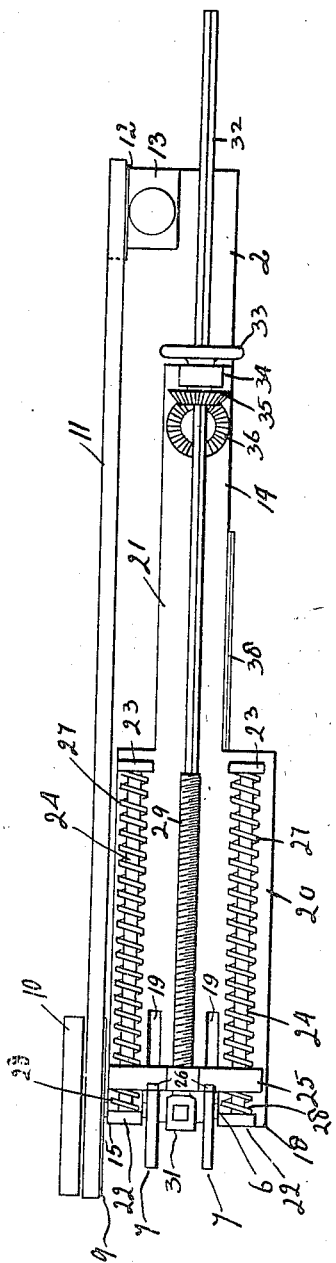
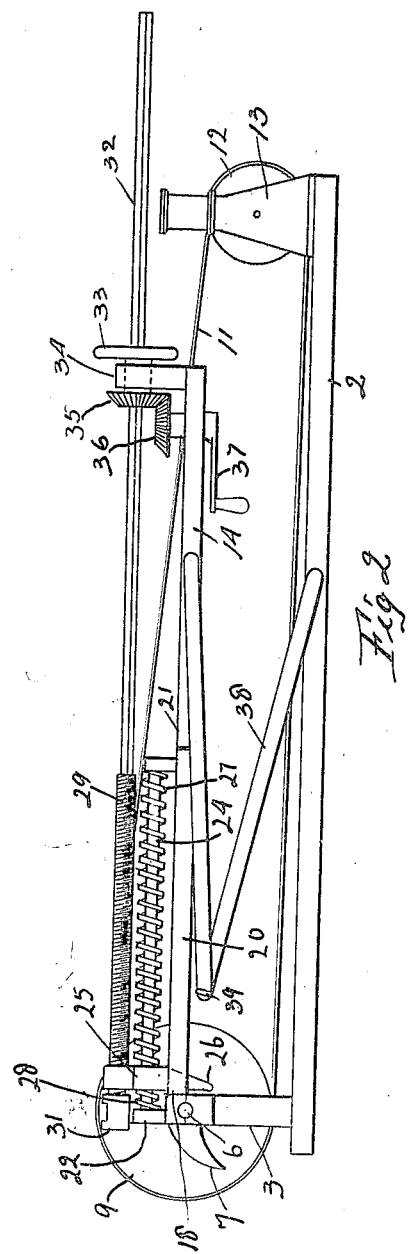
INVENTOR
Joseph Beaudry
By W. W. Williamson
Atty.

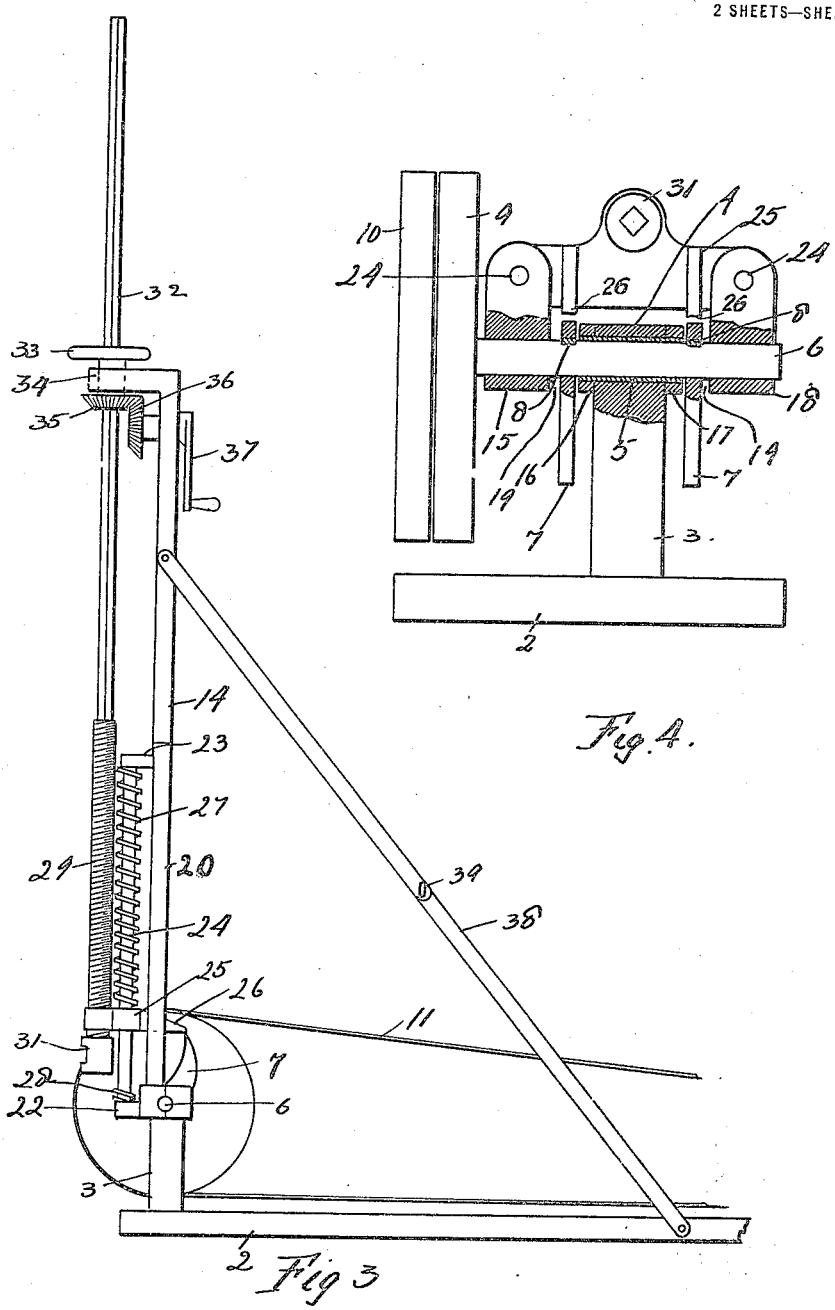

Patented Nov. 21, 1922.

1,436,470

UNITED STATES PATENT OFFICE.

JOSEPH BEAUDRY, OF PHILADELPHIA, PENNSYLVANIA.

ROCK DRILL.

Application filed October 22, 1920. Serial No. 418,698.

*To all whom it may concern:*

Be it known that I, JOSEPH BEAUDRY, a citizen of the United States, residing at Philadelphia, in the county of Philadelphia and State of Pennsylvania, have invented new and useful Improvements in Rock Drills, of which the following is a specification.

My invention relates to new and useful improvements in rock drills, and has for its object to provide an exceedingly simple and effective device of this character having an adjustable frame carrying the drilling mechanism, whereby a horizontal or vertical hole or holes at any angle between the horizontal and vertical may be readily drilled.

Another object of the invention is to provide improved means or mechanism for imparting an intermittent reciprocating motion to the tool or drill.

A further object of the invention is to construct the rock drill comprising a base having an upright to which is adjustably journalled a frame carrying slide bars on which is slidably mounted a cross head the latter being moved in one direction by cams and in the opposite direction by springs or their equivalent, said cross head having a spindle threaded therethrough which carries a tool chuck and feeding means for the spindle a portion of which cooperates with the squared end of the spindle to revolve the latter.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a plan view of a rock drill embodying my improvements.

Fig. 2, is a side elevation thereof.

Fig. 3, is a similar view showing the frame arranged in another position.

Fig. 4, is an enlarged end view thereof, portions being broken away and shown in section to clearly illustrate the construction.

In carrying out my invention as here embodied, 2 represents a base or platform at one end of which is located an upright or standard 3 having a bearing 4 in which is located a sleeve 5 the ends thereof projecting beyond the ends of the bearing as plainly shown in Fig. 4. Revolubly journalled in the sleeve 5 is a shaft 6 carrying cams 7 one of which is preferably arranged on each side of the upright or standard 3 and keyed to said shaft as indicated at 8 so as to revolve therewith and on some suitable portion of said shaft are also mounted the tight and loose pulleys 9 and 10 respectively, the tight pulley 9 being used to transmit power to the shaft 6 through means of a belt 11 or its equivalent running over a drive pulley 12 connected with some suitable source of power such as a motor 13 mounted at some suitable location upon the base or platform 2.

The frame 14 is journalled upon the shaft 6 so as to be adjustable thereabout by means of the arms 15, 16, 17 and 18, the space between the arms 16 and 17 accommodating the upright or standard 3 while the spaces 19 between the arms 15 and 16 and the arms 17 and 18 permit the passage of the cams 7 during their revolutions and also form channels for the depending lugs of the cross head as will be hereinafter more fully described.

The frame is preferably constructed so as to provide a body 20 from which projects the neck 21 of less width and said body portion carries at each side lugs 22 and 23 arranged in pairs, the lugs of each pair located at opposite ends of said body portion, while between the cooperating lugs of each pair is arranged a slide bar 24 the ends of which are fastened in said lugs. A cross head 25 is slidably mounted upon said slide bars and is provided with depending cam lugs 26 which project into the spaces or channels 19 and the walls forming the inner ends of these channels act as stops to limit the movement of the cross head in one direction or the direction in which it is moved by the cams, while said cross head is moved in the opposite direction by means of springs 27 or their equivalent preferably coiled about the slide bars 24 with one end of each engaging a lug 23 as the stationary member, while the other ends of said springs engage the cross head as the movable member and in order to prevent a great jar being transmitted to the parts of the device should the movement transmitted by the springs 27 to the cross head be too long I provide suitable buffers here shown as buffer springs 28 arranged upon the slide bars 24 between the cross head and the other slide bar supporting lugs 22.

The reference numeral 29 denotes a spindle one end of which is circular in cross section and provided with threads for screwing the same through a suitable barrel or enlargement on the cross head and also carries a tool chuck 31 for the reception of a suitable tool or drill, and the other end of said spindle is polygon sided or square in cross-section as at 32 and passes through a similarly shaped opening in the hand wheel 33 forming a part of the feeding mechanism, said hand wheel being journalled in the head 34 carried by the frame and projecting at right angles from the neck thereof whereby the rotation of the hand wheel 33 will revolve the spindle 29 to cause the tool chuck to move away from or toward the sliding cross head. If found desirable the hub of the hand wheel 33 may be provided with a beveled gear 35 meshing with another beveled gear 36 suitably journalled in the neck of the frame to which may be attached a suitable crank handle 37 for revolving the same and thereby transmitting motion to the spindle.

In order that the frame 14 may be held in different adjustments relative to the base or platform 2 while a hole is being drilled, I provide a two piece pivoted link 38 the members of which are pivoted to each other and one each to the platform or base and frame and any suitable means may be applied for holding these linked members rigidly in any adjustment and for convenience of illustration I have shown a pinch bolt 39 at their point of connection to each other.

In practice when it is desired to drill a hole horizontally or in a plane parallel with the plane of the base 2 the frame 14 is adjusted until parallel with said base 2, but when a vertical hole is desired or a hole at right angles to the plane of the base 2 then the frame is adjusted to the position shown in Fig. 3 where a hole is desired at some other angle between these two positions the frame may be adjusted at the desired angle relative to the base 2 as will be obvious.

After the frame has been properly adjusted the power is applied so that the shaft 6 will be revolved and during each revolution thereof the cams 7 will be brought into engagement with the depending cam blocks or lugs 26 thereby moving the cross head 25 in one direction which movement will compress the springs 27 so that as soon as said cams 7 leave the cam blocks or lugs 26, said springs will force the cross head in the opposite direction, thus the actions of the cams and springs impart an intermittent reciprocating motion to the cross head 25 and as the spindle 29 carrying the tool chuck 31 is threaded through said cross head, said spindle will be given a like motion which is that desired for drilling rock and the like. As the drilling operations progress it is necessary to feed the tool carried by the tool chuck forward and it being desirable that the cutting position of the tool be changed at the same time I provide the feed mechanism hereinbefore described which will revolve the spindle 29 during its forward movement relative to the cross head.

Of course I do not wish to be limited to the exact details of construction as herein shown as these may be varied within the limits of the appended claims without departing from the spirit of my invention.

Having thus fully described my invention, what I claim as new and useful is:—

1. A rock drill comprising a base, a frame adjustably mounted thereon, a slidable cross head movable with said frame, a spindle having threaded connection with the cross head and provided with means to rotate said spindle to adjust the same relative to said cross head and means for transmitting an intermittent, reciprocating motion to the cross head.

2. In a device of the character stated, a base, a frame supported thereby and adjustable relative thereto, slide bars carried by said frame, a cross head mounted on said bars, means for intermittently moving the cross head in one direction, springs for moving said cross head in the opposite direction, buffer springs for absorbing the shock of the cross head, a spindle having threaded connection with the cross head and means to rotate said spindle for changing the position thereof relative to the cross head.

3. In combination, a base, an upright carried thereby, a shaft journalled in said upright, a frame journalled on said shaft, said frame having slots or channels extending inwardly from one end, a head at the opposite end, cams fixed to the shaft and passing through said channels during their rotation, lugs carried by the frame and arranged in pairs, one pair at each side of the frame, slide bars mounted in said lugs, a cross head slidably mounted on said bars, depending cam blocks or lugs carried by the cross head and projecting into the channels in the frame whereby the cam will contact with said cam block to intermittently move the cross head in one direction, springs coiled about the slide bars to normally force the cross head in the opposite direction, buffer springs on said bars to absorb the shock of the cross head, a spindle having a polygon end passing through the frame head and provided at its other end with threads for threading it through the cross head whereby said spindle may be adjusted relative to said cross head, a tool chuck carried by the threaded end of said spindle, a hand wheel journalled in the frame head and through which slides the polygon end of the spindle whereby the latter may be revolved, a gear connected with said wheel, another gear mounted on the frame and meshing with the other gear, means for revolving the last named gear and a motor carried by the base whereby motion may be transmitted to the shaft.

In testimony whereof, I have hereunto affixed my signature.

JOSEPH BEAUDRY.